Aug. 29, 1967     A. V. RICE ET AL     3,338,990
METHOD OF MAKING AN INHIBITED, GAS-PRODUCING CHARGE
Original Filed May 28, 1964
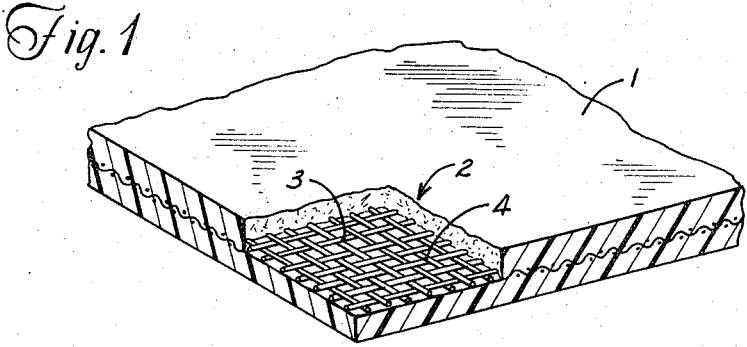
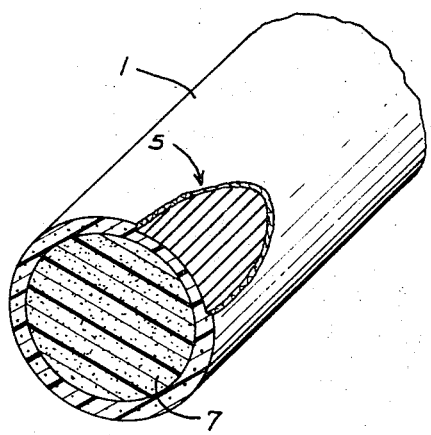 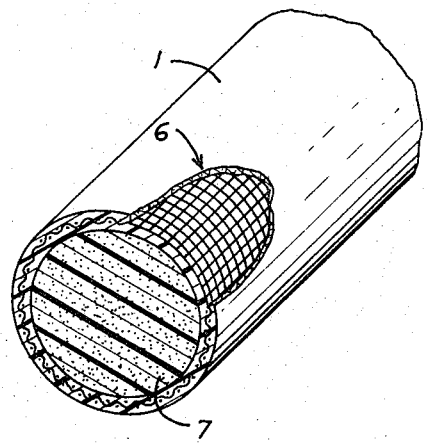
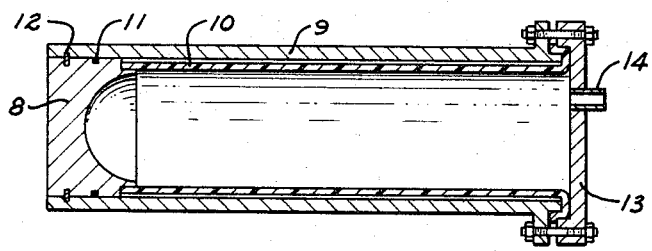
INVENTORS
ALVIST V. RICE
MYRON G. DE FRIES
ROLAND C. WEBSTER
BY Martha L. Ross
AGENT 3,338,990
METHOD OF MAKING AN INHIBITED,
GAS-PRODUCING CHARGE
Alvist V. Rice, Springfield, Myron G. De Fries, Falls Church, and Roland C. Webster, Annandale, Va., assignors to Atlantic Research Corporation, Fairfax, Va., a corporation of Virginia
Original application May 28, 1964, Ser. No. 370,954, now Patent No. 3,263,613, dated Aug. 2, 1966. Divided and this application Oct. 15, 1965, Ser. No. 496,614
2 Claims. (Cl. 264—3)

ABSTRACT OF THE DISCLOSURE

An inhibited gas-producing charge is prepared by placing a preferentially elastic inhibitor sleeve in a mold; introducing an uncured, gas-producing charge into the sleeve under pressure sufficient to expand the sleeve to conform with the mold; and curing the charge while the sleeve is in the expanded condition.

---

This is a divisional application of Alvist V. Rice et al. application, Ser. No. 370,954, filed May 28, 1964, issued Aug. 2, 1966, as U.S. Patent No. 3,263,613.

This invention relates to substantially non-porous sheet having a preferential direction of elasticity; to articles employing such a sheet, particularly inhibited gas-generating charges; and to methods of making such articles.

Sheet having a preferential direction of elasticity can be used to fabricate a variety of articles in which unidimensional elasticity is desirable.

Endless conveyor or power transmission belts which are elastic in their continuous circumferential dimension and resist change in width can be fabricated from the sheet of this invention. The stability of width prevents undesirable lateral motion of the belt on pulleys or drive shafts while the circumferential elasticity prevents slippage and absorbs shocks. Containers, such as luggage, drums, and the like, and container liners fabricated from preferentially elastic sheet will stretch in a predetermined dimension to accommodate overpacking or expansion of contents without being permanently deformed.

Such sheet can be advantageously used for construction of inflatable articles such as boats and balloons. Inflatable mandrels having a constant length and a diameter proportional to internal pressure can be formed from the sheet of this invention.

Sheet having a preferential direction of elasticity is particularly useful for inhibiting surface combustion of gas producing shaped charges such as rocket propellant grains and physically supporting such charges. In order to be effective, the inhibitor must remain intimately bonded to the charge. Shaped charges are subject to dimensional changes due to variations in temperature and pressure. If the inhibitor should crack or become separated from the charge during such dimensional changes, uncontrolled burning will occur on the exposed surfaces.

Inhibitors fabricated from elastic sheet in accordance with this invention are particularly advantageous, in that they prevent damage to the charge-inhibitor bond during storage under varying environmental conditions and under accelerative stresses. The preferentially elastic inhibitor expands and contracts in the transverse direction without any concomitant shearing action between the inhibitor and grain in the longitudinal direction. This, combined with the axial restraint, also prevents elongation of rocket grains towards or into the rocket nozzle when the grain expands as, for example, at high ambient temperatures.

The inhibitor may be bonded to a fixed portion of the motor case such as the head plate so that the less elastic dimension is oriented in the direction of accelerative force. Thus the inhibitor provides relatively rigid reinforcement of the propellant charge in this direction to prevent movement or fracture of the charge due to forces of acceleration.

An inhibitor which is rigid in all dimensions must be formed of materials having a coefficient of expansion similar to that of the charge in order to prevent separation of inhibitor from the charge during temperature cycling. The transverse elasticity of the inhibitor of this invention maintains the inhibitor in intimate contact with the charge during temperature cycling, therefore permitting a greater and often more satisfactory choice of materials for supporting the charge against accelerative forces in the axial direction.

It is an object of this invention to provide methods of making inhibited gas-generating charges.

Other objects will be readily apparent from the drawing and the following description.

Referring to the drawing:

FIGURE 1 is an exploded fragmentary perspective view of a preferentially elastic sheet formed in accordance with this invention.

FIGURES 2 and 3 are fragmentary perspective views of solid gas-producing charges having preferentially elastic inhibitors.

FIGURE 4 is a cross-sectional view of a propellant grain mold used in fabricating inhibited gas-producing charges in accordance with this invention.

The elastic sheet of this invention, an embodiment of which is shown in FIGURE 1, comprises a substantially non-porous, elastic, polymer sheet 1 in which is embedded a means 2 restraining the elasticity of the sheet. By a non-porous sheet is meant a sheet having substantial resistance to passage of fluids. The terms elasticity and elastic, except in the phrase modulus of elasticity, are used in the specification and claims in their popular sense to denote the quality of being capable of easy deformation and of quickly recovering from such deformation. Thus, more elastic denotes more easily deformed.

Elastic polymers which can be used include natural rubbers; synthetic rubbers such as butadiene, chloroprene, butyl, polysulfide, silicone, and urethane rubbers; polyesters; vinyl polymers and polyolefins.

The embedded restraining means 2 includes a material which is less elastic than the polymer sheet. Restraining means may be formed from materials which can include natural rubbers; synthetic rubbers; polyamides; polyesters, vinyl derivatives; polyolefins, rayons; cellulose esters; fluorocarbons, and acrylics; inorganic materials such as glass, asbestos, metals, and ceramics; and natural fibers such as cotton, flax, jute, hemp, manila, sisal, wool, horsehair and silk.

In the preferred embodiment of this invention the restraining means 2 is a woven fabric comprising a plurality of first threads 3 and a plurality of second threads 4 transverse to the first threads. The first threads 3 have a higher modulus of elasticity than the polymer sheet 1. The second threads 4 have a lower modulus of elasticity than the first threads.

A high modulus of elasticity signifies great resistance to deformation—that is, low elasticity. Thus the higher modulus first threads 3 are less elastic than the second threads 4. The stretchability of the sheet of this invention is most restricted in the direction in which the first threads are oriented. If the first threads have a very high modulus of elasticity or are incapable of being stretched, the sheet will not be stretchable in the direction of these threads. If the second threads have the same or a lower modulus of elasticity than the polymer sheet, the stretchability of the sheet will be unrestrained in the direction of the second threads. If the second threads have a modulus of elasticity higher than the modulus of the polymer sheet 1 there will be a proportional degree of restraint. Thus, by proper choice of relative elasticities of the first and second threads, the stretchability of the sheet may be restrained to the desired degree in either or both directions of the weave.

A woven restraining means may be handled as an integrated unit rather than as a plurality of separate restraining means. This greatly simplifies embedding the restraining means in the polymer.

In another embodiment of this invention as shown in FIGURE 2, the restraining means comprises a plurality of parallel threads 5 or other elongated restraints having a higher modulus of elasticity than the polymer 1 in which they are embedded. These restraints are oriented in one direction of the sheet. This embodiment, although possessing certain disadvantages in respect to ease of fabrication, permits use of restraining means which cannot conveniently be incorporated into a woven fabric.

In fabricating the sheet of this invention the restraining means is embedded in an uncured polymer which is then cured. By uncured polymer is meant any material which when cured, by vulcanization, aging, heat, chemical reaction, solvent evaporation, or other well known process, yields the non-porous elastic polymer previously referred to. These materials include monomeric, prepolymeric, uncured, solvated, or unvulcanized forms of such non-porous elastic polymers.

In one method of fabricating the sheet, a coating of uncured polymer is applied to a rubber fabricating mandrel. The restraining material is then wrapped around this coating and another coating of uncured polymer is applied. The polymer is then cured. This results in the restraining means being relatively centrally located within the sheet of cured polymer. In this method the viscosity of uncured polymer should permit the polymer to "strike through" or penetrate between the weave or other arrangement of restraining means so that all portions of the restraining means are in contact with the polymer. The use of closely spaced or finely woven restraining means requires a correspondingly less viscous uncured polymer.

If it is desired to have the restraining means embedded near the surface of the sheet, the second coating of polymer is omitted or the restraining means may be applied directly to the mandrel and covered with a polymer layer of desired thickness. The restraining means may also be relatively centrally embedded without use of a second polymer coat by applying the restraining means to the first polymer coat with sufficient force to embed such means to the desired depth.

In another method of fabricating the sheet a restraining means in the form of a woven sleeve 6 as shown in FIGURE 3 is used. This sleeve is slipped over the polymer coated fabricating mandrel and the process is completed as described above.

Obviously the sheet may be similarly made using a form having a surface which is flat or of any other desired shape, instead of a rubber fabricating mandrel. Also, additional layers of coating and restraining means may be applied to form a multiply sheet.

In selecting materials for fabrication of the sheet of this invention several factors are to be considered. The non-porous elastic sheet should be sufficiently elastic to permit the expansion which will be required in the more elastic direction of the finished sheet. The restraining means must, of course, be chosen to yield the desired degree of restraint. The restraining means should be able to withstand the conditions of polymer cure without substantial deterioration. When woven restraining means are used and only unidimensional restraint is required only the first higher modulus strands need withstand the cure. These are factors which can readily be determined for the specific requirements of a particular use from readily available literature and other information regarding the physical and chemical properties of the well known elastic polymers and the variety of materials available for use as the restraining means.

More specific examples of factors influencing choice of materials and elastic relationships in a sheet having a preferential direction of elasticity will be illustrated in describing the use of such sheet as combustion inhibitors for gas-producing shaped charges.

The non-porous, elastic sheet of this invention may be used as an inhibitor for any combustible, gas-producing shaped charge. The shaped charges are made of compositions which are self-contained with respect to their oxidizer requirements for combustion. Many compositions of such charges are well known. The charge may comprise an organic polymer component containing sufficient combined oxygen or other oxidizing element for combustion of other components of the molecule, such as nitrocellulose in a double-base type charge.

The charge may be of a composite type comprising a binder and fuel in addition to oxidizer components. Examples of suitable fuels and binders include alkyd and polyester resins, organic polysulfides, cellulose esters such as cellulose acetate, vinyl polymers such as polyvinyl chloride and polyvinyl acetate, polyurethanes, butadiene-methyl vinyl pyridines, polybutadiene-acrylonitrile and the like. The oxidizer can be any active oxidizing agent such as the ammonium or alkali metal perchlorates or nitrates and metal peroxides such as barium peroxide.

For use as an inhibitor the elastic sheet of this invention is fabricated from components which resist combustion or decompose at a slower rate than the solid charge to be inhibited. This requirement is normally satisfied by absence in the inhibitors of the oxidizers which are present in the gas-producing charge.

The inhibitor sheet must be securely bonded to the shaped charge. In some cases, the inhibitor polymer will bond directly to the charge during curing. In other cases, bonding agents and adhesives well known to those skilled in the polymer art can be used. Such bonding agents and adhesives include various rubber and plastic cements and synthetic resins. Preferably the more elastic dimension of the inhibitor generally has a modulus of elasticity not substantially higher than the modulus of elasticity of the shaped charge. This permits the charge to expand in the more elastic direction of the inhibitor without concomitant shearing action and prevents development of internal stress.

It may be desirable to use an inhibitor having a higher modulus of elasticity in its more elastic direction than the modulus of elasticity of the charge if the modulus of elasticity of the charge is so low as to give unsatisfactorily slow recovery of shape after deformation.

The inhibitor is preferably in a partially stretched condition when positioned on the combustible gas-producing shaped charge 7. The preferred degree of stretch is such as will produce sufficient elastic tension to hold the inhibitor to the charge when the charge contracts, but leave sufficient stretch to accommodate such expansion as may take place in the shaped charge during storage or combustion.

In one method of making an inhibited charge, a cylindrical sleeve is prepared which comprises a polymer sheet in which is embedded a woven fabric. The embedded fabric is oriented to restrain axial expansion of the sleeve while permitting expansion in the hoop direction.

If the finished inhibited solid charge is to be secured by attachment to a fixed member or portion of a combustion chamber such as the headplate 8, as shown in FIGURE 4, of a motor case, the inhibitor is preferably first attached to such fixed portion or member. Attachment may be accomplished by the use of adhesives or by mechanical means such as retaining rings or clamps. The inhibitor 10 and headplate 8 if attached, is then placed into a grain mold 9. The interior of the inhibitor sleeve may be treated with an adhesive to facilitate bonding to the charge. Uncured charge is introduced into the sleeve under pressure causing the sleeve to stretch to conform to the mold. The charge is then cured. This process results in an inhibited charge whose dimensions are as accurate as those of the grain mold.

In another method of making an inhibited combustible, gas-producing shaped charge, an inhibitor sleeve of restrained axial elasticity is prepared as above. This sleeve is then stretched over a cured shaped charge. An adhesive can be used if necessary to effect an intimate bond.

In another method of making an inhibited shaped charge, the inhibitor sheet is wrapped around the cured charge, an adhesive being used if necessary to effect a secure bond. Preferably the sheet is partially stretched during wrapping so that elastic forces are created which will conform the sheet to the charge as the charge undergoes dimensional changes. Such methods may be advantageously used to prepare inhibited shaped charges of varying shapes and sizes.

*Example 1*

A cylindrical, preferentially elastic, sleeve was prepared as follows:

A coating, approximately 0.02 inch thick, of styrene-butadiene rubber stock (Redar SB 500–01 obtained from R. E. Darling Co.) was applied to a rubber fabricating mandrel. The mandrel was 60 inches long and tapered from 4.1 inches to 3.9 inches.

A tubular fabric 5 inches in lay-flat width and woven of nylon threads in the axial direction and Spandex (Du Pont polyurethane) threads in the hoop direction was stretched over the coated mandrel. The relative elasticities of these materials were such that the sleeve was substantially more elastic in the hoop direction. Another rubber stock coating, approximately .03 inch thick was applied.

The sleeve was cured with heat and pressure.

*Example 2*

An inhibited solid propellant grain was prepared, using the inhibitor sleeve of Example 1. The larger end of the tapered sleeve was bonded to a metal head plate with a standard commercial bonding agent. The interior of the sleeve was then treated with a bonding agent to facilitate bonding to the propellant grain.

The sleeve thus bonded to the headplate was introduced into a tapered grain mold 9, as shown in FIGURE 4, the headplate being sealed in position with an O-ring 11 and a retaining ring 12. The open end of the sleeve was stretched over the end of the mold and held in place with a plate 13. Thus positioned there was a space of about 0.05 inch between the exterior of the sleeve and the grain mold.

A deaerated uncured propellant mix comprising a polybutadiene-acrylic acid resin base and ammonium perchlorate oxidizer was introduced into the mold through an opening 14 in the plate. The mix was cured under heat and pressure expanding the sleeve to conform to the mold dimensions. The resulting inhibited grain was as dimensionally accurate as the mold.

Although this invention has been described with reference to illustrative embodiments thereof, other embodiments within the scope of the appended claims will be apparent to those skilled in the art.

We claim:

1. A method of making the combination of a combustible gas-producing shaped charge and an inhibitor for restricting combustion of said charge, said method comprising
   (a) placing an inhibitor comprising a cylindrical sleeve of substantially non-porous, cured elastic polymer and means embedded in said sleeve for restraining the elasticity of said sleeve in the axial direction and effecting a preferentially radial direction of elasticity of said sleeve into a mold, and
   (b) introducing an uncured, combustible gas-producing charge into said inhibitor, and
   (c) applying sufficient pressure to said uncured, combustible gas-producing charge to expand said inhibitor to conform to said mold, and
   (d) curing said uncured, combustible gas-producing charge while the inhibitor is in an expanded condition produced by step (c).

2. The method of claim 1 further comprising coating the interior of the cylindrical sleeve of said inhibitor with a bonding agent prior to introduction of said uncured, combustible gas-producing charge.

References Cited

UNITED STATES PATENTS

| | | | |
|---|---|---|---|
| 2,926,386 | 3/1960 | Hutchinson | 264—3 |
| 3,056,171 | 10/1962 | Fite | 264—3 |
| 3,107,573 | 10/1963 | Butcher | 86—1 |
| 3,108,433 | 10/1963 | De Fries et al. | 102—98 |

FOREIGN PATENTS 26,430 1907 Great Britain.

L. DEWAYNE RUTLEDGE, *Primary Examiner.*